United States Patent [19]

Miller

[11] 4,273,974

[45] Jun. 16, 1981

[54] ELONGATE SWITCH CONSTRUCTION

[76] Inventor: Norman K. Miller, Concord Industrial Park, Concordville, Pa. 19331

[21] Appl. No.: 19,428

[22] Filed: Mar. 12, 1979

[51] Int. Cl.³ .............................................. H01H 3/16
[52] U.S. Cl. .................................. 200/61.43; 49/27; 200/61.71; 200/86 R
[58] Field of Search ............................... 49/26, 27, 28; 200/61.43, 85 R, 85 A, 86 R, 86.5, 86 A, 61.62, 61.71, 61.73, 61.42

[56] References Cited

U.S. PATENT DOCUMENTS

| | | | |
|---|---|---|---|
| 2,790,873 | 4/1957 | Fleming | 200/86 R |
| 3,818,162 | 6/1974 | Monroe et al. | 200/86 R |
| 4,051,336 | 9/1977 | Miller | 200/61.43 |
| 4,115,952 | 9/1978 | French | 200/61.43 |

Primary Examiner—S. J. Witkowski
Assistant Examiner—Morris Ginsburg
Attorney, Agent, or Firm—Robert K. Youtie

[57] ABSTRACT

An elongate switch construction including an elongate base and an elongate flexible working member having a concave inner face and disposed longitudinally of the base with its concavity facing toward the base, an elongate rib or tongue projecting internally of the working member into the hollow thereof toward and terminating short of the base, and a pair of elongate contacts respectively carried by the base and tongue in spaced relation with each other and displaceable into contacting engagement upon deflection of the working member.

4 Claims, 7 Drawing Figures

4,273,974

ELONGATE SWITCH CONSTRUCTION

BACKGROUND OF THE INVENTION

As is well known to those versed in the art of door edge switches, and the like, a high degree of versatility and adaptability is required to enable a switch construction to be employed in many different environs, for example as a safety door edge in sensing the presence of an obstacle to door movement, as a safety machinery stop switch to prevent machinery operation with persons in dangerous positions, as in signalling switches for use in public vehicles, door treadles and the like. The lack of versatility and diversity in prior switch constructions has limited usage and increased costs by requiring many different custom made products. Examples of prior art which are known to applicant include U.S. Pat. Nos. 4,051,336; 3,986,577 and 3,118,984.

SUMMARY OF THE INVENTION

It is, therefore, an important object of the present invention to provide an elongate switch construction which overcomes the above mentioned difficulties and is highly flexible for utilization in a wide variety of applications, including being mounted upon non-flat surfaces, being responsive to actuating forces through a wide angle of application, and even permitting of end mounting of the switch as for actuation by bending of the switch device about an angle relative to itself.

It is another object of the present invention to provide a switch construction of the type described wherein at least a working member is fabricated of resiliently flexible material having memory, so as to permit of actuating deflection and return to its original form, and further wherein the working member is of an elongate, generally constant cross-sectional configuration of arcuate form wherein a laterally medial longitudinal, internal rib defines a contact carrying tongue and the longitudinal edge portions are of reduced flexibility, as by increased thickness, so that externally applied forces throughout a wide angle tend to urge the tongue generally radially of the arcuate formation.

It is a further object of the present invention to provide a switch construction of the type described which is uniquely well adapted for manufacture by mass production techniques for effecting substantial economies, while achieving a switch structure of high reliability, long lasting durability and high versatility for satisfactory capability in a wide variety of diverse applications.

It is still another object of the present invention to provide a switch construction having the advantageous characteristics mentioned in the preceding paragraphs, which may be conveniently and economically produced with a selected variation in sensitivity over its length, which sensitivity variation may be programmed in manufacture as desired.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENTS

Figure 1:
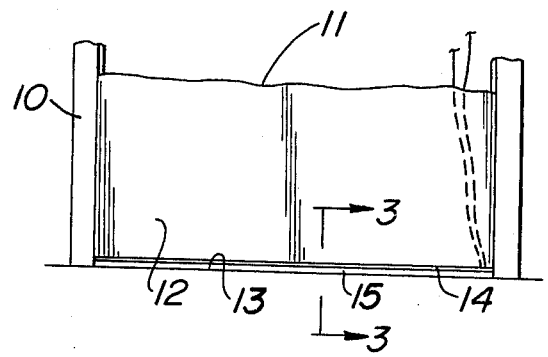
FIG. 1 is an elevational view showing a door incorporating a switch construction of the present invention.

Referring more now particularly to the drawings, and specifically to FIG. 1 thereof, a doorway is there generally designated 10, bounding a door opening 11, in which is mounted a door 12. The door 12 is illustrated as being an overhead door, as for opening vertical movement away from a threshold 13, and downward closing vertical movement toward the threshold. Along the lower edge 14 of the overhead door 12 extends a switch construction 15 of the present invention.

While the switch construction 15 will be illustrated and described hereinafter in association with an overhead door, it is appreciated that the switch construction is capable of many varied applications, all of which are intended to be comprehended herein. For example, the switch construction 15 may be applied to horizontally moving doors, as in elevators, trains, and the like, may also be employed for signalling, as by manual deflection in trains, busses and the like, and may also be employed in other environs, as safety switches in association with industrial machinery, floor treadles for signalling or controlling doors, and many other varied applications, all without departing from the spirit and scope of the present invention.

Figure 3:
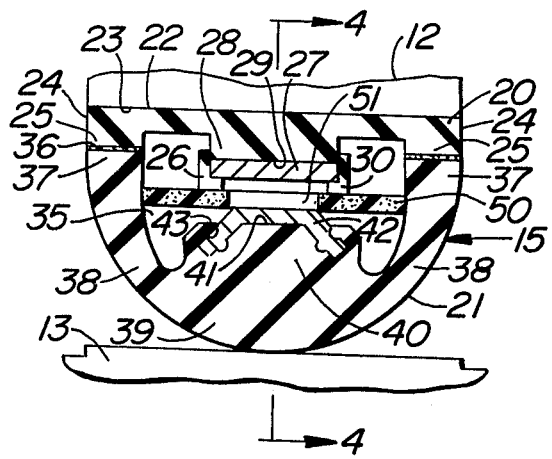
FIG. 3 is an enlarged sectional elevational view taken generally along the line 3—3 of FIG. 1.
Figure 4:
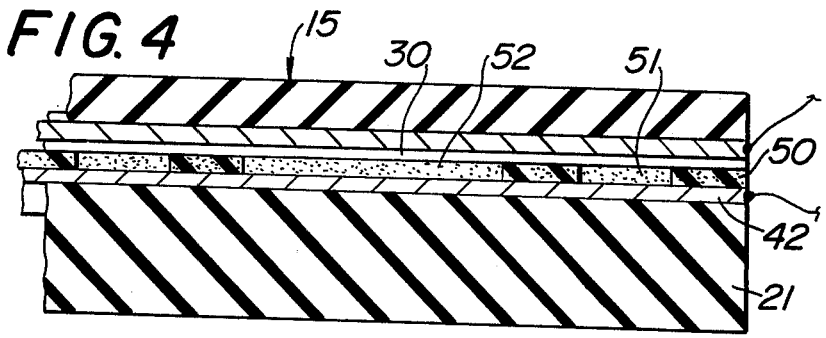
FIG. 4 is a partial longitudinal sectional view taken generally along the line 4—4 of FIG. 3.
Figure 2:
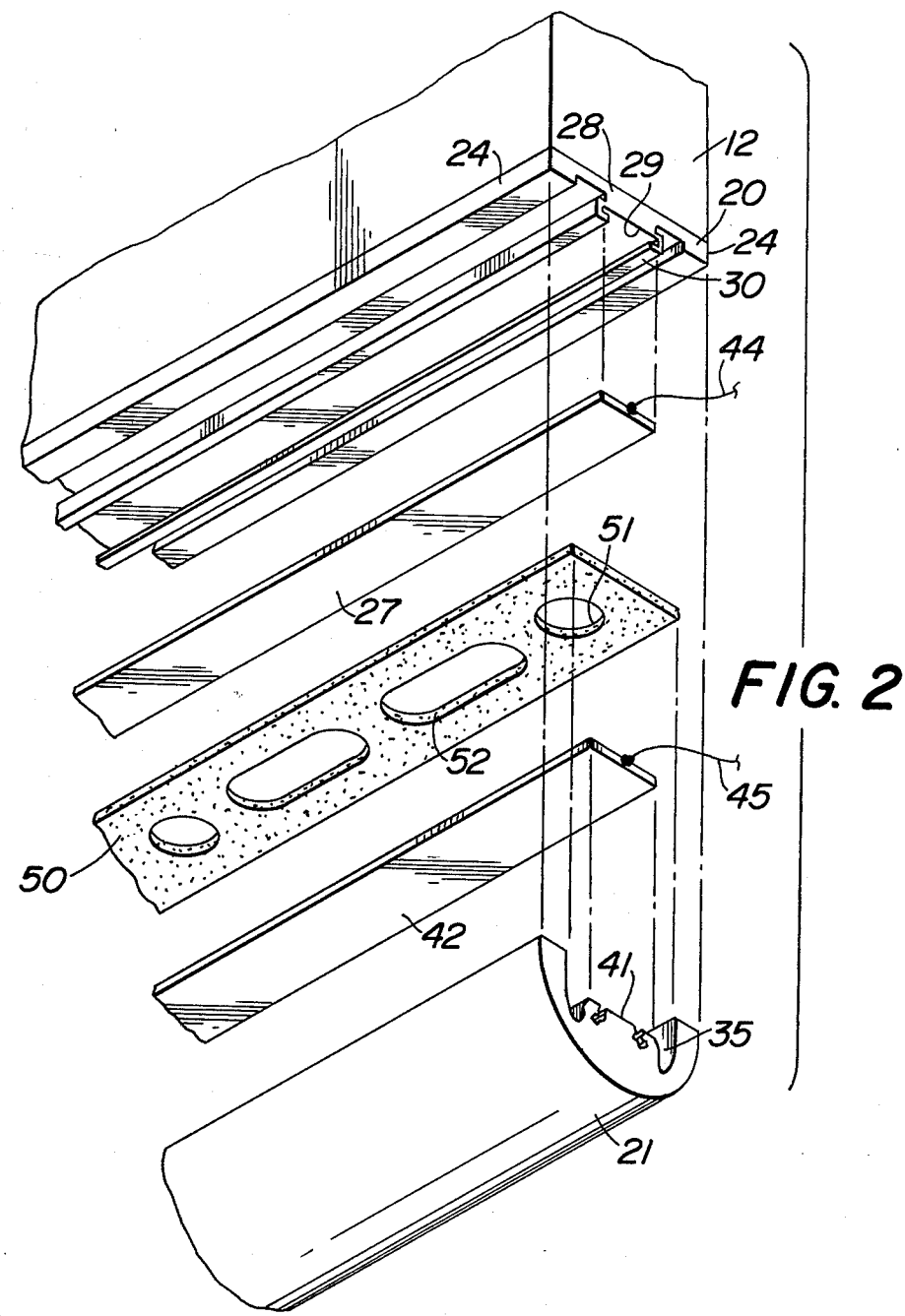
FIG. 2 is an exploded, perspective and enlarged view showing a switch construction in accordance with the teachings of the instant invention.

Referring now to FIGS. 2–4, the switch construction 15 may include a pair of elongate, generally congruent outer members, specifically a base member 20 and a working member 21. Both the base and working members 20 and 21 may be fabricated or resiliently deflectable form retaining material, such as rubber, plastic or the like. Particularly, it is advantageous that the working member 21 be fabricated of a material having memory, so as to return to its original form after deflection.

The base 20 may be of constant cross section throughout its length, lending itself to economic fabrication by extrusion, and may be of elongate, rectangular configuration, provided with an outer face 22, which may be generally flat, for facing engagement with the leading edge 23 of door 12. Any suitable fastening means may be employed to secure the base 20 to the door 12. Should the surface 23 of door 12, or other desired mounting surface be other than flat or regular, the base 20 is advantageously of sufficient flexibility to permit of firm securement to the mounting surface.

Along opposite longitudinal edges 24 of the base 20 there are provided longitudinally extending ribs or lands 25, coextensive with the base and projecting away from the base surface 22. Laterally medially of the base 20, generally longitudinally coextensive therewith, and spaced between the side edge lands 25, is a conductor retainer 26 for retaining an elongate conductor 27. The conductor retainer 26 may be defined by a longitudinally extending rib 28, spaced equally between the lands 25, and projecting away from the outer base surface 22. The conductor carrying rib 28 may terminate in a conductor carrying surface 29 bounded along longitudinal sides with retaining flanges 30, so that the conductor 27 is retained on the surface 29 by side edge flanges 30. Other suitable conductor retaining means may be employed, such as adhesive, or other.

The conductor 27 between the flanges 30 is exposed and presented inwardly of the switch construction for contact with a mating conductor, as will appear more fully hereinafter.

The material of conductor 27 may be of any suitable type, metallic foil having been found satisfactory by reason of its great flexibility, but other conductive materials may find satisfactory use in various applications.

The working member 21 is also an elongate resiliently flexible part, say of rubber or suitable material having memory, and may be of constant cross section throughout its length, as adapted for mass production by extrusion. In general, the working member 21 may be considered as of arcuate or generally semi-circular cross sectional configuration having its concave or inner side facing toward the base 20. Further, the concavity of the working member 21 is closed by the base 20, so that the latter combines with the working member to define therebetween a longitudinally extending internal hollow 35.

The working member 21 is in generally congruent facing relation with the base 20, the working member having its longitudinal edges 36 suitably secured in facing engagement with respective lands 25, as by adhesive or other suitable means. The longitudinal edge portions 37 of the working member 21 are relatively thick, corresponding to the width of the lands 25, and taper or diminish in thickness away from the edge surfaces 36. Each of the relatively thick longitudinal edge portions 37 of the working member 21 may be considered as of gradually reducing thickness or tapering in the direction away from its edge surface 36 for approximately 45° of the transversely arcuate extent of the working member to a longitudinally extending intermediate portion 38. Between the longitudinally extending intermediate working member portions 38 there is a longitudinally extending medial portion 39 which is of increased thickness internally of the working member to define therein a longitudinally extending rib or tongue 40.

That is, the external surface of working member 21 may be of any desired configuration, the drawing showing a generally semi-cylindrical form, and there is provided internally, projecting radially inwardly from a laterally medial region of the working member the thickened rib or tongue 40, which terminates in a conductor carrier surface 41 in facing spaced relation with the base conductor 27. Carried on the carrier surface 41 may be an elongate flexible conductive strip or tongue conductor 42, being suitably secured to the tongue 40, as by flanges 43, or other suitable means. In the undeflected condition in FIG. 3, it will appear that the tongue conductor 42 is disposed in facing spaced relation with the base conductor 27.

Upon deflection of the working member 21, as by a force applied to the exterior surface through a wide included angle, the tongue 40 and its conductor 42 are displaced toward and into engagement with the base conductor 27. As seen in FIG. 2, the base conductor 27 is connected in an electrical circuit by an externally extending wire or conductor 44, and the tongue conductor 42 is electrically connected in circuit by an externally extending conductor or wire 45. Thus, upon facing engagement of the conductors 27 and 42, a circuit is closed therebetween say to operate signal means, power means, control means, or the like.

It will be appreciated that by the increasing thickness, and therefore stiffness, of the working member edge portions 37 toward the edge surfaces 36, flexure of these edge portions is minimized. Conversely, by the relative thinness, and therefore flexibility of the intermediate working member portions 38, flexure of these intermediate portions is facilitated. Hence, it will be understood that displacement of the tongue 40 and tongue contact 42 is generally normal to the base contact 27 for maximizing contacting engagement therewith. Thus, throughout a wide angle, force applied to the exterior of working member 21 will serve to displace the tongue contact 42 directly toward and into facing engagement with the base contact 27. This is necessarily so, as the intermediate portions 38 flex to displace the tongue 40 generally toward the base contact 27 with minimum deflection laterally of the switch construction.

In certain applications it may be desired to increase the resistance of working member 21 to deflection, or provide a selected variation in resistance to working member deflection along the length of the switch. Toward this end, a resistance member or strip 50 is interposed in the internal hollow 35, extending longitudinally therealong, say in the form of an open work flexible strip 50, which may advantageously be fabricated of foam, or the like. The resistance member or strip 50 may extend substantially entirely across the internal hollow 35, and es provided along its length with a series of through openings or cutouts, as at 51 and 52. It will be seen, in FIGS. 2 and 4, that different size cutouts or holes are provided, 52 being larger than 51, so that the region about hole 51 affords greater resistance to engagement between contacts 27 and 42 than does the region about relatively large hole or contact 52. If even greater resistance is desired, smaller holes, further spaced may be formed; and conversely larger holes more closely spaced may afford less resistance, a minimum of resistance being achieved by omitting the resistance member 50. The selected variation in resistance along a particular switch construction may be employed to detect lighter loads in certain areas, say through a personnel door in a vehicle door, or in other situations, where desired.

Figure 5:
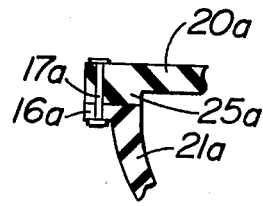
FIG. 5 is a fragmentary sectional view similar to FIG. 3, showing a slightly modified embodiment.

While the base and working member parts in the embodiment of FIGS. 1-4 are illustrated as adhesively secured together, as at 36, there are other satisfactory modes of securement. For example, as seen in FIG. 5, the base 20a may be secured to the working member 21a by provision on the working member of a securement flange 16a overlying the base land 25a Suitable fastener means, such as a rivet 17a may extend through the flange 16a and base 20a for securement between the switch parts.

Figure 6:
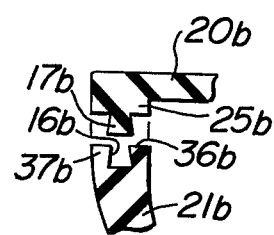
FIG. 6 is another fragmentary sectional view similar to FIG. 3, but showing a further embodiment, the parts being exploded for clarity.

In FIG. 6 is shown another embodiment wherein a base 20b includes a longitudinal marginal land 25b provided on its face with an undercut lug, projection or rib 17b. The edge margin 37b of working member 21b is provided in its edge surface 36b with an undercut cavity or receiver 16b for receiving and releasably retaining lug 17b. The receiver 16b may be a hole or groove, for conformably receiving the projection 17b which may be a lug or rib.

Figure 7:
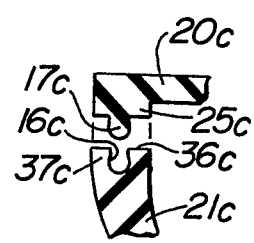
FIG. 7 is a partial, sectional, exploded view similar to FIG. 6 but showing still another embodiment.

In the embodiment shown in FIG. 7, a base 20c is provided with a longitudinal marginal land 25c having on its surface an outstanding projection 17c. The edge portion 37c of working member 21c is provided on its edge surface 36c with a receiver or cavity 16c. The projection 17c may be bulbous in cross section, either being that of a pin or rib, while the receiver 16c is conformably shaped to receive the projection 17c. The embodiments of FIGS. 6 and 7 may be detachable, if desired, as for alteration or modification of the switch construction at the site of installation, or for other reason.

From the foregoing, it is seen that the present invention provides a switch construction which is extremely simple in structure, lending itself to relatively inexpensive, mass production while permitting of widely varying characteristics, both in different switches and also in the same switch, for achieving great versatility in use, and otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A switch construction comprising an elongate base, an elongate resiliently flexible working member extending longitudinally of and in facing relation with said base, said working member being transversely concave toward said base and combining therewith to define a longitudinally extending internal hollow, an elongate base contact disposed longitudinally within said hollow and carried by said base facing toward said working member, a flexible tongue on said working member extending internally of said hollow toward and terminating short of said base contact, and an elongate tongue contact carried by said tongue in facing spaced relation and displaceable into engagement with said base contact upon flexure of said working member, said working member being of arcuate generally constant cross-section and comprising a pair of relatively thick longitudinal edge portions secured to said base and tapering in the direction away from said base to a pair of relatively thin longitudinally extending intermediate portions, said tongue being defined by a relatively thick longitudinally extending medial portion of said working member between said intermediate portions and isolated from said edge portions for relatively free movement of the tongue and tongue contact generally toward said base upon application of external force, by the initial flexing tendency of said relatively thin intermediate portions and the relative resistance to flexing of the edge portions.

2. A switch construction according to claim 1, said base contact being generally flat and located generally laterally medially of said base, said tongue terminating in a generally flat carrying surface generally parallel to said base contact and said tongue contact having a generally flat laterally medial portion carried by said carrying surface in generally parallel spaced relation with said base contact for displacement into surface engagement therewith.

3. A switch construction according to claim 1, in combination with an open resiliently compressible resistance member interposed between said base and tongue contacts to increase resistance to contact engagement, said resistance member having a selected openwork configuration to offer a selected resistance to contact engagement.

4. A switch construction according to claim 3, said resistance member having a varying openwork configuration along its length to afford a selected varying resistance to contact engagement along the switch length.

* * * * *